May 3, 1927.
G. J. CRAWFORD
1,626,788
TRACTIVE DEVICE
Filed Feb. 16, 1926
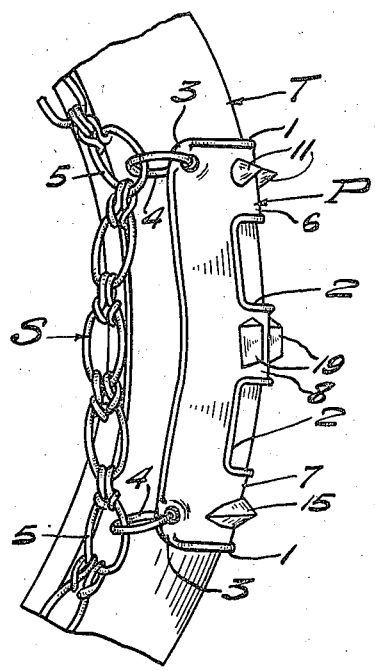
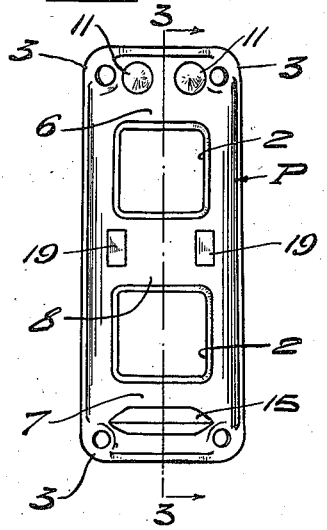
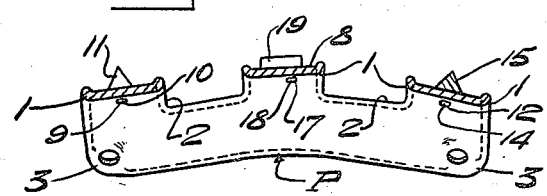
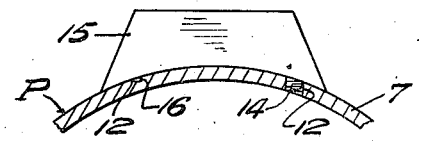
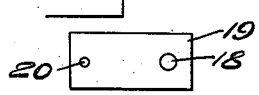
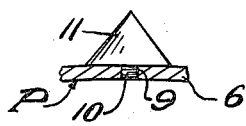
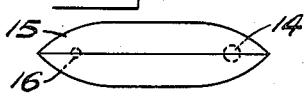
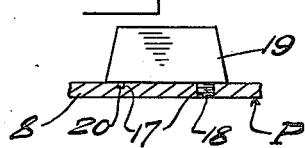
Inventor
G. J. Crawford
By Watson E. Coleman.
Attorney Patented May 3, 1927.

1,626,788

UNITED STATES PATENT OFFICE.

GUS J. CRAWFORD, OF BAKER, MONTANA.

TRACTIVE DEVICE.

Application filed February 16, 1926. Serial No. 88,671.

This invention relates to tractive devices and it is an object of the invention to provide a device of this kind adapted to be applied to the tread portion of a wheel to provide means to substantially eliminate the liability of said wheel slipping or skidding.

Another object of the invention is to provide a device of this kind comprising a series of plates adapted to be applied to the tread portion of a wheel or more particularly the tire thereon, together with means for maintaining said plates in applied position and wherein each of the plates is provided with lugs so positioned and arranged to substantially eliminate both slippage and skidding.

The invention consists in the details of construction and in the combination and arrangement of the several parts of my improved tractive device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a fragmentary view in side elevation illustrating a tractive device constructed in accordance with an embodiment of my invention in applied position;

Figure 2 is a view in top plan of the tread member unapplied;

Figure 3 is a longitudinal sectional view taken substantially on the line 3—3 of Figure 2;

Figure 4 is a transverse sectional view taken through one end portion of Figure 2;

Figure 5 is a view in top plan of the lug or calk shown in Figure 4;

Figure 6 is a bottom plan view of one of the intermediate calks or lugs;

Figure 7 is a view partly in section and partly in elevation illustrating the lug as disclosed in Figure 6 in applied position;

Figure 8 is a view partly in section and partly in elevation illustrating one of the conical lugs or calks in applied position.

As herein disclosed, my improved tractive device comprises a plurality of plates P each of desired dimensions and curved both longitudinally and transversely to snugly engage the tread portion of a tire T. Each of the plates is preferably of a width to have its side marginal portions extend approximately one-half way inwardly of the tire T and the side and end marginal portions of the plate are rolled inwardly and upwardly, as at 1, to prevent said edges from damaging the tire T or to interfere with the desired creeping of the plate circumferentially of a tire as occurs when the wheel is in transit.

The plate P is preferably made of spring steel and of a thickness to permit the same to readily give to assure smooth riding and which will have a tendency to give or yield when passing over a rock or other abnormal obstruction with which it may come in contact. The plate P adjacent its opposite end portions is also provided with the relatively large holes 2 which permit mud, snow, dirt and the like that may come between the plate P and tire T to readily work out.

At its corners, the plate P is raised, as at 3, and with said raised portions are connected the links 4 which are also engaged with links 5 of the side chains S. These chains S are of any preferred type and can be applied to the wheel and maintained in such position in any manner desired. The raised portions 3 at the corners of the plate P prevent undue wear upon the links 4 and particularly when either the plate or the side chains are creeping.

The openings 2 result in the plate P being provided with the end cross strips 6 and 7 and an intermediate cross strip 8. The end strip 6 at points spaced transversely of the plate P is provided with the openings 9 in each of which is threaded a shank 10 carried by the base portion of a conical calk or lug 11. The shank 10 is of such a length as not to project beyond the inner surface of the strip 6 or plate P when in applied position.

The opposite end bar or strip 7 is provided with the transversely disposed openings 12 in one of which is adapted to be threaded a shank 14 depending from one end portion of an elongated lug or calk 15. Depending from the opposite end portion of the calk or lug 15 is a pin 16 which, when the calk or lug 15 is properly mounted upon the cross member or bar 7, will be received within the second opening 12 to hold said applied calk or lug 15 against rotation.

The intermediate cross member or strip 8 adjacent its opposite ends is provided with the longitudinally aligned openings 17 and in one of said openings of each pair is threaded a shank 18 depending from an elongated lug or calk 19 which, when in applied position, extends lengthwise of the plate P. This shank 18 is adjacent to one end of the calk or lug 19 and depending from the opposite end portion of the lug or calk 19 is a pin 20 which is received within the second opening 17 to hold said calk or lug 19 against turning movement when in applied position.

Each of the lugs 15 and 19 is substantially V-shaped in cross section with its apex outwardly disposed. By this formation, the lugs may readily free themselves after being embedded within mud or the like.

The arrangement of the lugs 11, 15 and 19 is such to effectively withstand the tendency of slippage or skidding. It is to be understood that as many plates P are to be employed in connection with a single wheel as may be preferred although it has been found of advantage to have adjacent plates arranged in relatively close proximity so that shortly after one of the plates leaves a road surface a second plate will come in contact therewith.

From the foregoing description it is thought to be obvious that a tractive device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A tractive device, comprising a flexible plate curved transversely and longitudinally to engage the tread of a tire, the side and end marginal portions of the plate being rolled inwardly and upwardly, the corners of said plate being raised and formed with openings, the body portion of said plate being formed with relatively large openings adjacent each end thereof to provide end and intermediate cross strips, each having threaded openings and surface engaging calks formed with lugs adapted to be removably fitted into said openings and positioned upon the exterior surface of the end and intermediate strips.

In testimony whereof I hereunto affix my signature.

G. J. CRAWFORD.